US005588536A

United States Patent [19]

Rohr

[11] Patent Number: 5,588,536

[45] Date of Patent: Dec. 31, 1996

[54] DREDGE WITH BI-DIRECTIONAL GRIZZLY

[76] Inventor: Jochen Rohr, 1 Field La., Cincinnati, Ohio 45208

[21] Appl. No.: 404,176

[22] Filed: Mar. 13, 1995

[51] Int. Cl.[6] .............................. B07B 1/52; B65G 45/00

[52] U.S. Cl. .......................... 209/385; 209/388; 209/393; 209/651; 209/678; 198/370.01; 198/498; 37/340

[58] Field of Search .................................... 209/240, 255, 209/352, 357, 379, 385, 386–388, 392, 393, 630, 651, 675, 677, 678; 198/370.01, 494, 497, 498, 499; 37/340, 341; 241/24.21

[56] References Cited

U.S. PATENT DOCUMENTS

| | | | |
|---|---|---|---|
| 4,116,326 | 9/1978 | Tuman | 209/387 X |
| 4,253,573 | 3/1981 | Dubberly et al. | 209/651 X |
| 4,867,383 | 9/1989 | Terry et al. | 241/24.21 |
| 5,072,991 | 12/1991 | Rohr | 209/261 X |
| 5,179,793 | 1/1993 | Rohr | 37/71 |
| 5,259,130 | 11/1993 | Rohr | 37/338 |
| 5,421,108 | 6/1995 | Stewart | 209/678 X |
| 5,427,251 | 6/1995 | Landmann et al. | 209/388 |
| 5,449,072 | 9/1995 | Braun et al. | 209/678 X |

FOREIGN PATENT DOCUMENTS

| | | | |
|---|---|---|---|
| 1808416 | 4/1993 | U.S.S.R. | 209/387 |

*Primary Examiner*—William E. Terrell
*Assistant Examiner*—Tuan Nguyen
*Attorney, Agent, or Firm*—Wood, Herron & Evans, P.L.L.

[57] ABSTRACT

A water based dredge includes a grizzly with a sieve and a pair of bi-directional rakes. The rakes translate relative to the stationary sieve to slide waste or recoverable material off of the grid and onto a refuse barge or material processing apparatus, respectively. A grab deposits dredge material onto the sieve and an operator determines whether the material includes waste such as clay or the like or recoverable material such as rocks, dirt, or sand. If the operator determines that the dredge material is waste, the rakes will be actuated for movement from a first direction to thereby push the waste off of the grizzly and onto a refuse barge. If the operator determines that the dredge material includes recoverable material, the rakes will be operated in a second direction so the recoverable material is slid from the grizzly and into a crusher or other appropriate processing apparatus.

19 Claims, 5 Drawing Sheets

DREDGE WITH BI-DIRECTIONAL GRIZZLY

BACKGROUND OF THE INVENTION

This invention relates to water based dredges, and more particularly, to a grizzly for such a dredge which efficiently distributes recoverable material and waste to the appropriate locations after being deposited thereon.

Water based and floating dredges typically include at least one or more bucket or clamshell-type grabs which are lowered into a waterway to collect sand, clay, gravel, or the like from the bottom of the waterway. The grab typically deposits the collected material onto a grizzly which often includes a plurality of generally parallel bars forming a sieve. The dredged material often contains components whose value justifies recovering them such as sand and gravel. Other components such as clay are not desirable for recovery and are simply collected for removal and disposal. Separating the recoverable material from the unrecoverable, however, in the past has been a time consuming process. Previously, all dredged material was processed with a conventional grizzly through a material handling apparatus even when it contained nothing of value, such as clay or the like.

One prior method to determine whether dredge material includes recoverable matter is to inspect a load of dredge material in the grab when it breaks the water surface. If there is no recoverable material, the load is simply dumped into a refuse barge located nearby. If recoverable material is found in the grab, it is then deposited onto the grizzly for further processing. A problem associated with this system is the ability of the operator to accurately determine whether the dredged material includes recoverable material or simply clay while it is still in the grab. Visual inspection inside the grab is very difficult and an accurate determination of the contents therein is even more problematic. As a result, this process of dredging has proven to be very slow and time-consuming and does not offer a reliable determination of the components of the dredged material in the grab.

Another prior solution was to deposit the dredged material onto the grizzly for inspection by the operator. If the operator determined that the dredge material included worthwhile, recoverable material, it was processed through the material handling apparatus of the floating dredge. Alternatively, if the operator determined that the dredged material deposited on the grizzly consisted of clay and other undesirable materials, the bucket or clamshell grab is once again lowered to pick up the unrecoverable material from the grizzly and deposit it onto a waiting refuse barge.

This method enabled the operator to inspect the dredged material outside of the grab after it is deposited onto the grizzly. However, if the dredge material is clay and other waste, it must be picked up once again by the grab and transferred to the refuse barge for disposal. This process has also proven to be very time consuming and inefficient in the handling and determination of the components of dredged materials.

SUMMARY OF THE INVENTION

A primary objective of this invention has been to provide an improved dredge which offers both an accurate and reliable system for determining the components of dredged material and an efficient and expedient way for handling both waste and recoverable material.

It has been a further objective of this invention to provide such a system which does not require inspection of the dredged material in the grab for the determination of recoverable material or not.

It has been a still further objective of this invention to avoid the necessity of collecting waste material deposited on the grizzly with the grab for disposal.

These and other objectives of the invention have been obtained by a grizzly according to a presently preferred embodiment of this invention which includes a bi-directional rake and sieve system. The grizzly includes a sieve comprised of a plurality of generally parallel and spaced bars. The grab deposits the dredged material directly onto the sieve where it is inspected by the operator to determine the presence of recoverable components. The grizzly further comprises a pair of movable rakes which are initially positioned at opposite ends of the sieve. Each rake includes a plurality of downwardly projecting teeth and each tooth is positioned between a pair of adjacent bars of the sieve.

If the operator determines that the dredged material deposited on the sieve is clay or other waste material, the first rake is actuated and slides across the upper surface of the sieve to push the waste in a first direction off of the sieve and onto a chute. The chute is directed to a refuse barge adjacent the dredge for disposal of the waste. If the operator determines that the dredged material deposited by the grab on the sieve contains recoverable material, then the second rake is actuated and slides in a second direction across the upper surface of the sieve to push the recoverable material into a crusher positioned adjacent the grizzly. The crusher processes and crushes the larger boulder-like components of the recoverable material. The recoverable material exits the crusher and is deposited onto a conveyor for transfer to a land based station and/or further processing.

When the dredged material is deposited onto the sieve, sand and other components are strained through the sieve between the spaced parallel bars and into a material handling apparatus positioned directly below the grizzly. After this material exits the material handling apparatus, it is also transferred by conveyors to the land based station for further processing. Furthermore, the material which is strained through the sieve may be mixed with the crushed material and collectively transferred to the land base station.

A driver assembly is connected to each of the rakes of the grizzly and in a presently preferred embodiment includes a winch, cable and a plurality of pulleys for the movement of the rakes in the first and second directions as described. In one embodiment, the dredge includes a pair of grizzlies according to this invention with the crusher positioned therebetween. As a result, the operator can alternatively inspect dredged material on the first grizzly and actuate the driver assembly for removal of the dredge material as appropriate. Meanwhile another load of dredged material is being deposited onto the second grizzly for the operator to inspect.

As a result, the grizzlies can be operated in a sequential, continuous fashion by an operator or operators thereby improving the efficiency and effectiveness of the dredging process. Furthermore, an accurate determination of the components of the dredged material is made and the waste and recoverable material can be efficiently handled with the bi-directional rake system and grizzly according to this invention.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
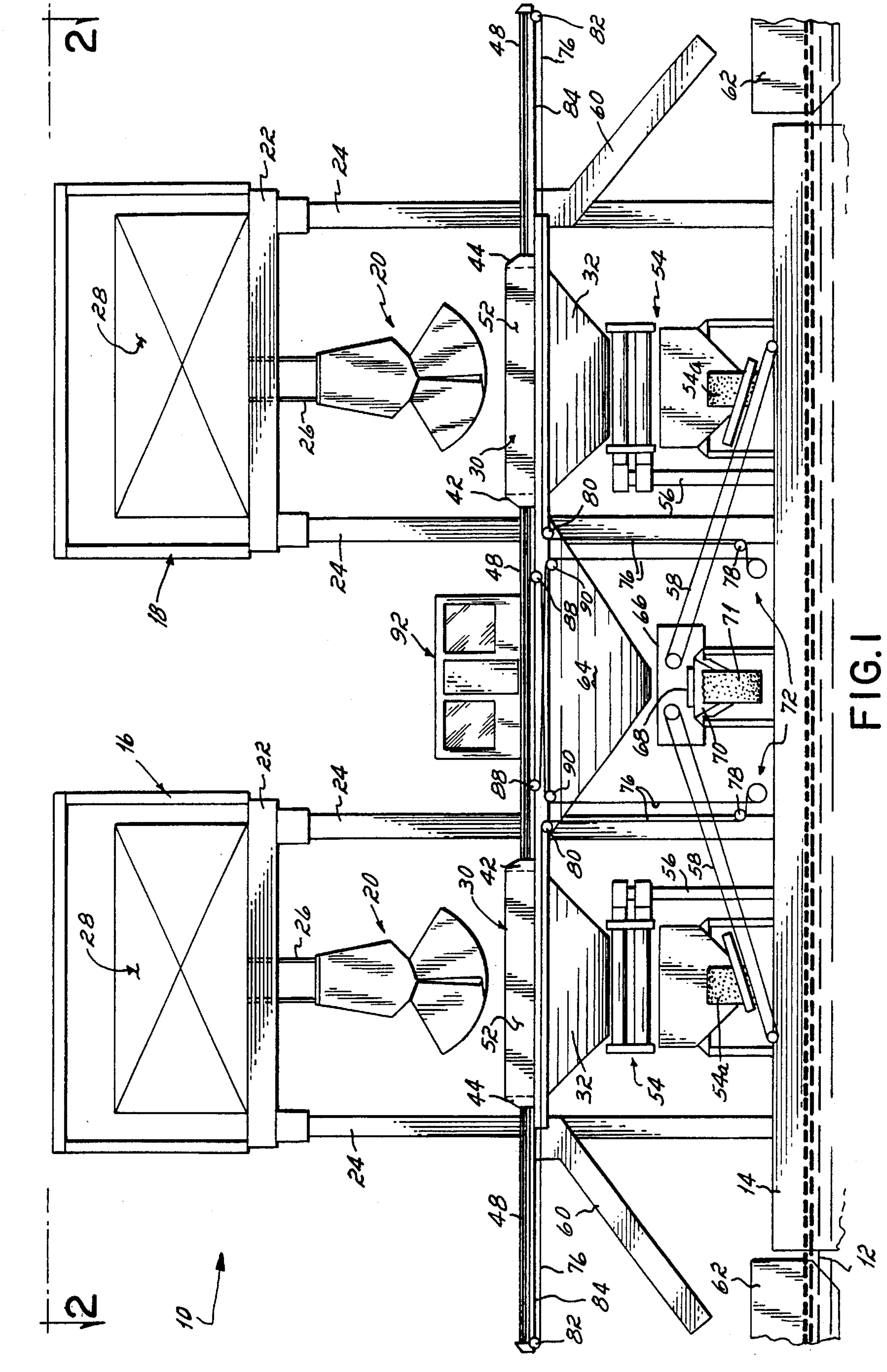
FIG. 1 is an elevational view of one embodiment of a floating dredge according to this invention.
Figure 2:
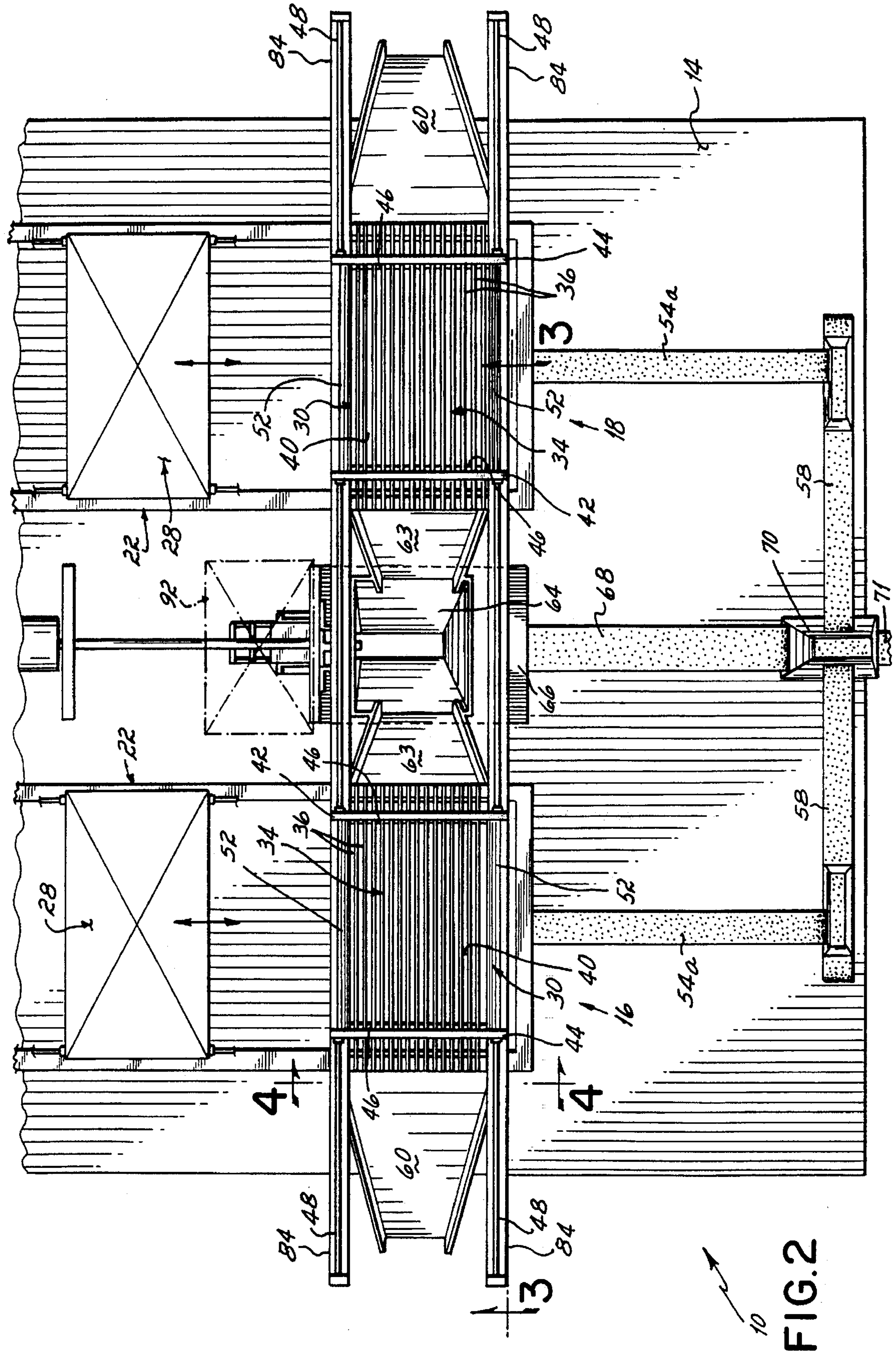
FIG. 2 is a partial plan view of the dredge as seen along line 2—2 of FIG. 1.

A floating dredge 10 in a waterway 12 according to a presently preferred embodiment of this invention is shown in FIGS. 1 and 2. The dredge 10 shown and described herein includes pontoons 14. While the dredge 10 is shown comprising at least one pontoon 14, it should be understood that the present invention is not limited to a pontoon supported or catamaran type dredge, but includes other suitable floating dredge structures and any type of water based dredge.

A presently preferred embodiment of the dredge 10 according to this invention includes a first and a second dredge station 16, 18, respectively. The dredge stations 16, 18 are preferably identical in construction and are mirror images of each other. The similar components of each dredge station 16, 18 will be identified with like reference numerals herein and in the drawings.

Each dredge station 16 or 18 includes a clamshell-type grab 20 which is suspended from a gantry 22. The gantry 22 is supported above the surface of the pontoons 14 or the like by uprights 24. The grab 20 is suspended by lines 26 from the gantry 22 and is movable as by a winch, counterweight, and other required apparatus identified collectively as 28 as is well known in the art for the operation of the grab 20. The grab 20 is movable from a position directly over a grizzly 30 as shown in FIG. 1 to a position (not shown) from which it is plunged into the waterway 12 for the collection and removal of sand, clay, gravel, or the like from the bottom of the waterway.

Figure 4:
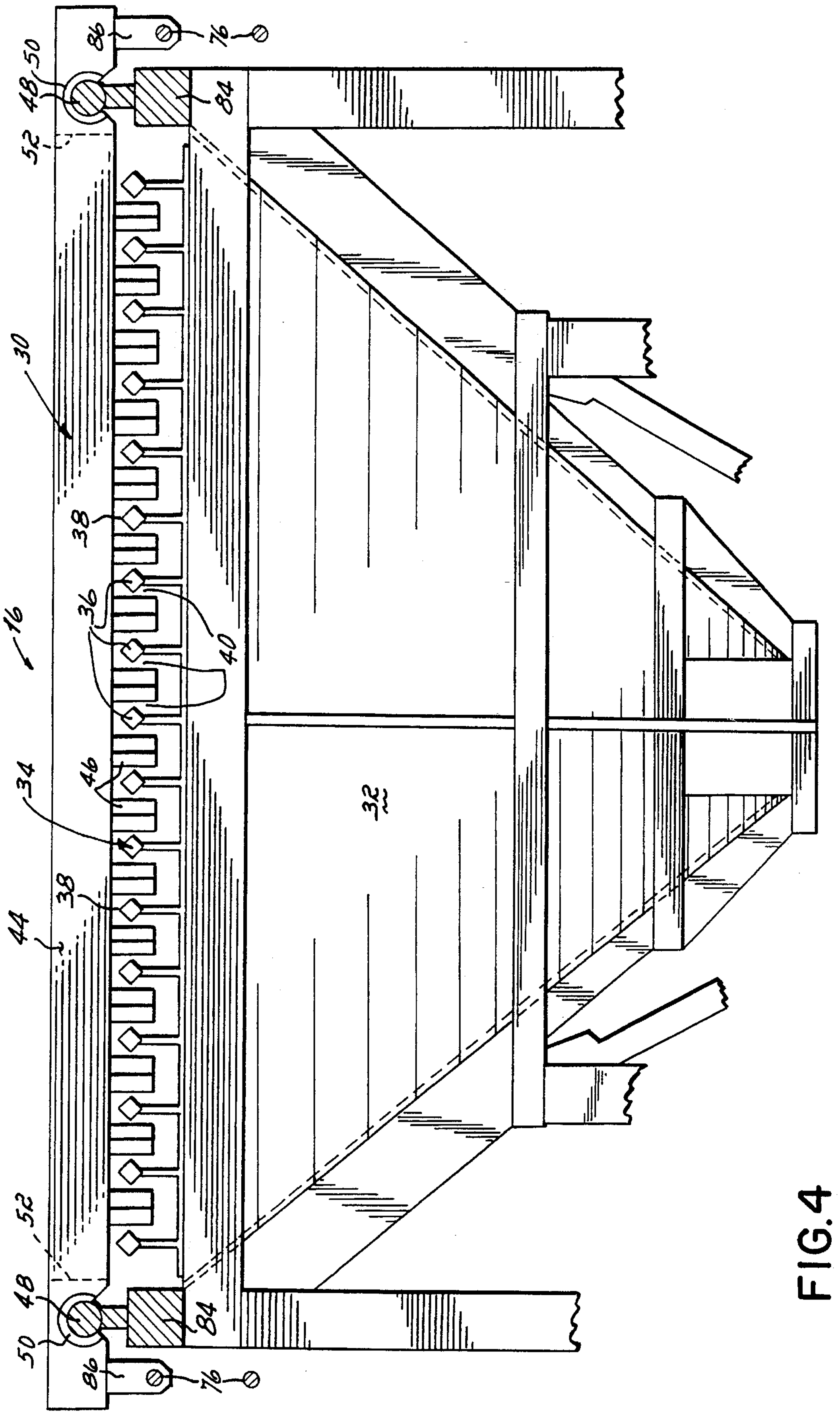
FIG. 4 is a cross-sectional enlarged view of a grizzly according to this invention taken along line 4—4 of FIG. 2.
Figure 5:
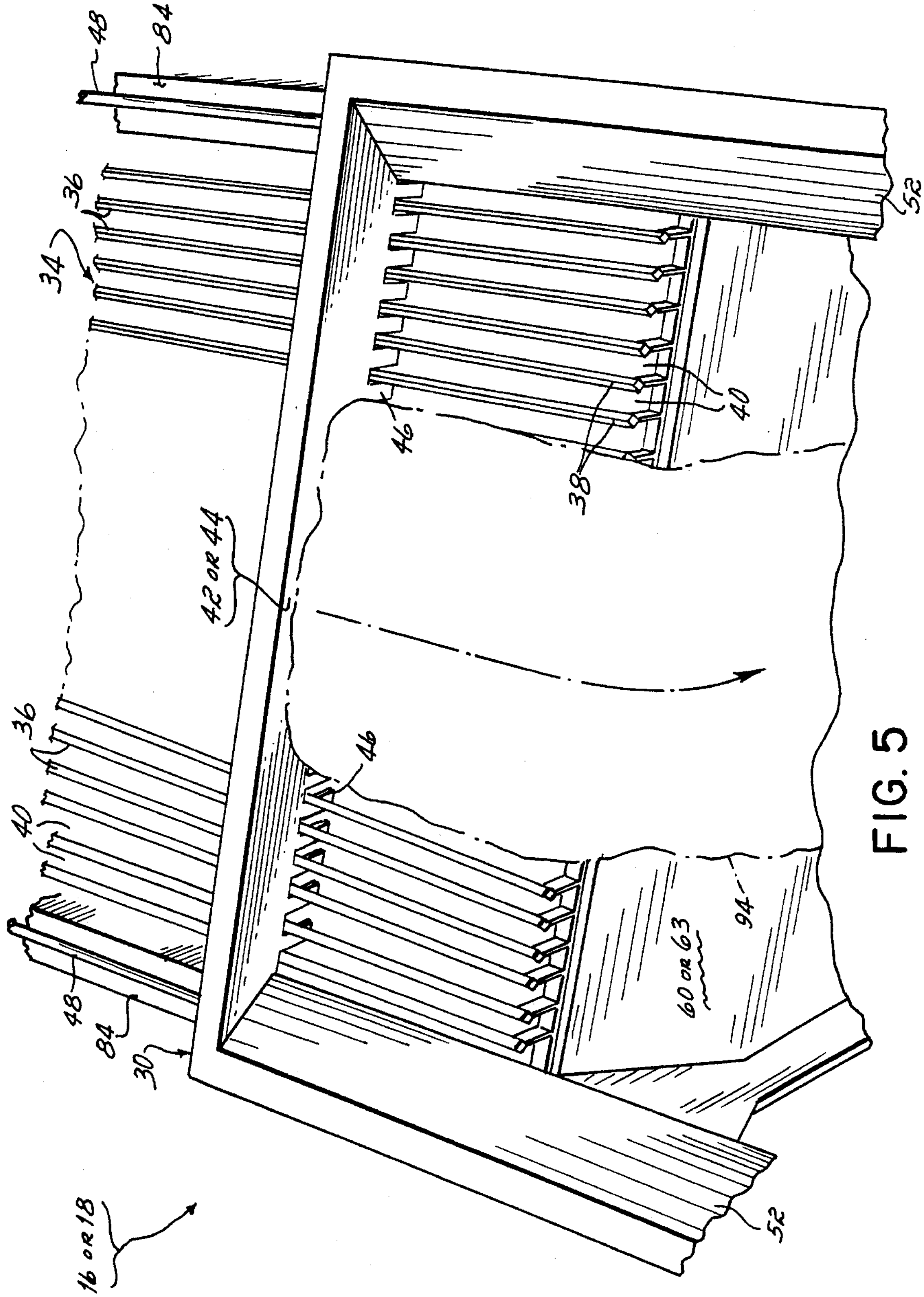
FIG. 5 is an enlarged schematic perspective view of a sieve and either one of two of the rakes of the grizzlies according to this invention.

Each grizzly 30 includes a grizzly hopper 32 positioned immediately below a sieve 34 comprised of generally parallel spaced bars 36. Each bar 36 has a generally rectangular cross-sectional configuration and a point 38 on an upper surface thereof as shown particularly in FIG. 4. Gaps 40 are defined between an adjacent pair of the spaced bars 36. Each grizzly 30 includes a first, inner rake 42 and a second, outer rake 44 which are movable and initially positioned proximate opposite ends of the sieve 34. The rakes 42, 44 extend generally perpendicular to the bars 36 (FIG. 2). Each rake 42, 44 includes a plurality of downwardly projecting teeth 46 in which each tooth 46 is positioned in the gap 40 between an adjacent pair of the spaced bars 36 (FIG. 4). The rake 42 or 44 is supported upon a pair of spaced rails 48 proximate each end of each rake 42, 44 and the rails 48 are seated within a mating notch 50 formed proximate each end of each rake 42, 44. In a preferred embodiment, the first and second rake 42, 44, respectively, of each grizzly 30 are joined together by a pair of side frame members 52 to form a generally rectangular peripheral frame (FIG. 5).

Beneath each grizzly 30 is the grizzly hopper 32. The sieve 34 screens, filters or strains out large material and prevents it from falling into the hopper 32. The material that advances through the sieve 34 and into the hopper 32 is directed into a material handling apparatus 54 supported on a post 56 which is then deposited onto a conveyor 58. A discharge chute 60 is positioned at each outer end of each sieve 34 for directing waste material which is raked off of the grizzly 30 and onto the discharge chute 60. From the discharge chute 60, the waste falls onto a refuse barge 62 or other receptacle docked or positioned adjacent to the dredge 10 for disposal of the waste.

Adjacent each dredge station 16, 18 at an inside end of each sieve 34 is a chute 63 and a crusher hopper 64. The hopper 64 accepts recoverable material which is retained atop the sieve 34 and raked inwardly toward the hopper 64. The hopper 64 directs the recoverable material, consisting of larger rocks and the like, into a crusher 66 for crushing and processing. The crushed recoverable material is then deposited onto a conveyor 68 for transfer to another hopper 70 where it is mixed with material on conveyor 58 that has been strained through the sieve 34. The combined recoverable material from hopper 70 is transferred by conveyor 71 or other means (not shown) to the land based station (not shown) for further processing.

Figure 3:
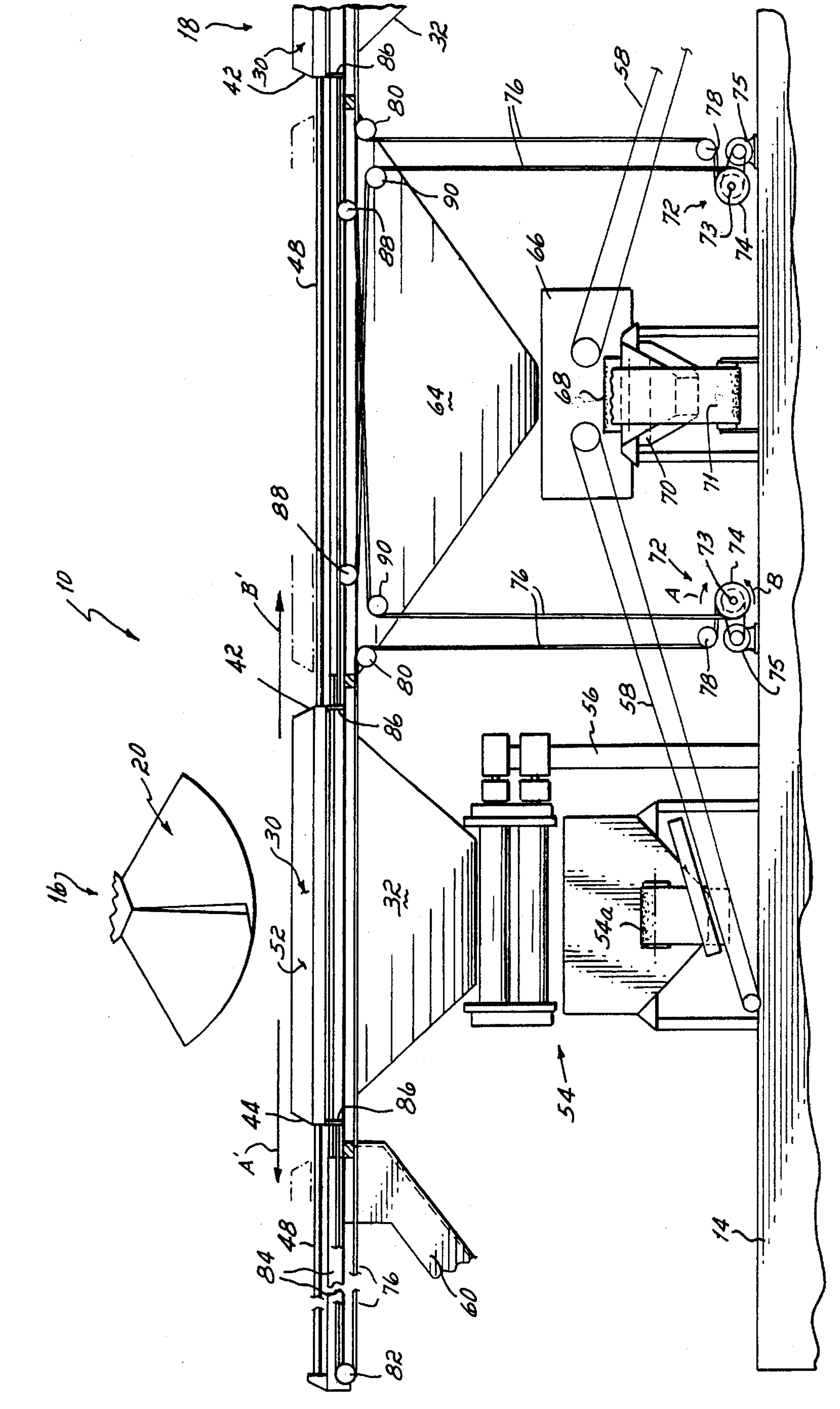
FIG. 3 is a cross-sectional view taken along line 3—3 of FIG. 2.

A driver assembly 72 is provided for each grizzly 30 for the movement of the rakes 42, 44 in the appropriate directions. The driver assembly 72 includes a pair of winches 74 on a common shaft 73 driven by a single motor 75 and is positioned between the crusher 66 and the material handling apparatus 54 of each station 16, 18 in a presently preferred embodiment of the invention. A cable 76 is connected to each winch 74 and is routed around a first pulley 78 proximate the winch 74 and upwardly around a second pulley 80 proximately the grizzly 30 and then outward around a third pulley 82 mounted on a beam 84 proximate the discharge chute 60. The cable 76 is secured at one end to a tab 86 projecting downwardly from the outer rake 44 as shown in FIG. 4. The other end of the cable 76 is similarly attached to the inner rake 42 and is routed back to the winch 74 via fourth and fifth pulleys 88, 90, respectively, as shown in FIG. 3. The driver assembly 72 translates the inner and outer rakes 42, 44 across the sieve 34 in a first outward direction toward the discharge chute 60 and a second inward direction toward the crusher 66. Rotation of the winch 74 in the direction of arrow A on FIG. 3 produces movement of the cable 76 around the first, second and third pulleys thereby translating the rakes 42, 44 outwardly in the first direction toward the discharge chute 60 in the direction of arrow A'. Reverse rotation of the winch 74 in the direction of arrow B translates the rakes 42, 44 towards the crusher 66 in the second inward direction indicated by arrow B'.

The operation of the presently preferred embodiment of the dredge 10 according to this invention is as follows. Refuse barges 62 are each docked in positions adjacent the dredge 10 as shown in FIG. 1. One of the clamshell grabs 20 is positioned over the waterway 12 and lowered to the floor thereof. When the grab 20 has captured a load of material, it is raised above the surface of the water and then positioned over the grizzly 30 associated therewith. The dredged material is then deposited onto the sieve 34 of the grizzly 30. A portion of the recoverable material such as sand and small gravel will fall through the sieve 34 into the hopper 32 for processing by the material handling apparatus 54 including a conveyor 54*a*. The conveyor 58 will then transfer this material to the hopper 70 and conveyor 71 for transfer to the land based station.

The operator located in a control cabin 92 between the stations 16, 18 inspects the dredged material 94 retained atop the sieve 34 and determines whether it contains clay and other waste products or recoverable material such as larger rocks and the like (FIG. 5). If the dredged material 94 on the sieve 34 contains clay, the operator actuates the winch 74 for rotation in the direction of arrow A, thereby moving the rakes 42, 44 in the direction of arrow A' so the inner first rake 42 translates across the sieve 34 and pushes the clay and other waste material from the sieve 34 and onto the discharge chute 60 and ultimately the refuse barge 62. Once the waste is removed from the sieve 34, the winch 74 is actuated for reverse rotation in the direction of arrow B so that the rakes 42, 44 are returned to their initial position and spaced on opposite ends of the sieve 34 as shown in FIG. 2.

If, based on the operator's determination, the dredged material 94 remaining atop the sieve 34 contains recoverable material then the winch 74 is actuated for rotation of the direction of arrow B so that the rakes 42, 44 move in the direction of arrow B'. The second outer rake 44 pushes the recoverable material off of the sieve 34 and into the crusher hopper 64 for processing by the crusher 66 and transfer by the conveyor 68 to the hopper 70 and conveyor 71 to the land based station. Once the recoverable material is removed from the sieve 34, reverse rotation of the winch 74 in direction of arrow A returns the rakes 42, 44 to their initial position and spaced on opposite ends of the sieve 34.

In combination with the operation of one of the dredging stations 16 or 18 as previously described, the other dredging station 18 or 16 will be operated similarly to maximize the efficiency and productivity of the dredge 10. The dredging stations 16, 18 will preferably be operated in a serial manner such that the operator can alternately handle the grab 20 and rakes 42, 44 of the dredging stations 16, 18 or multiple operators can each be assigned to one of the dredging stations 16 or 18 and work in conjunction to maximize efficiency and productivity of the dredging operation.

From the above disclosure of the general principles of the present invention and the preceding detailed description of a preferred embodiment, those skilled in the art will readily comprehend the various modifications to which the present invention is susceptible. For example, although the grizzly 30 of the preferred embodiment shown herein includes rakes 42, 44 which are capable of movement in first and second directions, the scope of the present invention includes a sieve which can be alternately pivoted upwardly in first and second directions to thereby slide the waste or recoverable material in the appropriate directions or other alternative embodiments.

Further, although the present invention has been shown and described herein with reference to a dredge, it could be readily employed in other fields such as mining, gravel or other applications. Therefore, I desire to be limited only by the scope of the following claims and equivalents thereof.

I claim:

1. A system for separating recoverable material from waste material, said system comprising:

a stationary sieve for straining a portion of material deposited thereon;

a first and a second rake, said first and second rakes being movable and initially positioned at first and second spaced ends of said sieve, respectively; and a driver assembly connected to said first and second rakes to selectively move said first and second rakes across said sieve in first and second directions, said driver assembly selectively moving said first rake in said first direction to slide waste deposited on said sieve off of said sieve for disposal, said driver assembly also selectively moving said second rake in said second direction to slide recoverable material deposited on said sieve off of said sieve for processing.

2. The system of claim 1 wherein said driver assembly comprises a winch and a plurality of pulleys being interconnected by cable.

3. The system of claim 1 wherein said sieve comprises a plurality of spaced generally parallel bars, said bars being generally perpendicular to said rakes and aligned with said first and second directions.

4. A dredge comprising:

a grab;

a grizzly having a stationary sieve for straining a portion of material deposited thereon and a first and a second rake, said first and second rakes being movable and initially positioned at first and second spaced ends of said sieve, respectively; and a driver assembly connected to said first and second rakes to selectively move said first and second rakes across said sieve in first and second directions, said driver assembly selectively moving said first rake in said first direction to slide waste deposited on said sieve by said grab off of said sieve for disposal, said driver assembly also selectively moving said second rake in said second direction to slide recoverable material deposited on said sieve by said grab off of said sieve for processing.

5. The dredge of claim 4 wherein said driver assembly comprises a winch and a plurality of pulleys being interconnected by cable.

6. The dredge of claim 4 wherein said sieve comprises a plurality of spaced generally parallel bars, said bars being generally perpendicular to said rakes and aligned with said first and second directions.

7. The dredge of claim 6 wherein said rakes each include a plurality of downwardly projecting fingers, each said finger projecting between a pair of adjacent said bars.

8. The dredge of claim 4 further comprising:

a pair of spaced side frame members extending between said first and second rakes, said side frame members being joined to said rakes to define a generally rectangular frame.

9. The dredge of claim 4 further comprising:

a crusher being positioned relative to said grizzly to receive said recoverable material therein after said recoverable material is slid from said grizzly by said second rake.

10. The dredge of claim 9 further comprising:

a second grab, a second grizzly and a second driver assembly being similar to said grab, said grizzly and said driver assembly, respectively, said crusher being positioned between said grizzly and said second grizzly.

11. A water based dredge comprising:

a first and second grab;

a first and second grizzly associated with said first and second grab, respectively, each said grizzly having a stationary sieve for straining a portion of material deposited thereon and a first and second rake, said first and second rakes being movable and initially positioned at first and second spaced ends of said sieve, respectively;

a driver assembly connected to said first and second rakes of each said grizzly to selectively move said rakes across said sieve associated therewith in first and second directions, said driver assembly selectively moving each said first rake in said first direction to slide waste deposited on said sieve by said grab associated therewith off of said sieve for disposal, said driver assembly also selectively moving each said second rake in said second direction to slide recoverable material deposited on said sieve by said grab associated therewith off of said sieve for processing;

a crusher positioned between said first and second grizzlies to receive said recoverable material after it is slid from each of said grizzlies; and recoverable material handling apparatus positioned below each of said grizzlies to process a portion of said recoverable material which passes through each said sieve.

12. The dredge of claim 11 wherein each said sieve comprises a plurality of spaced generally parallel bars, said bars being generally perpendicular to said rakes and aligned with said first and second directions.

13. The dredge of claim 12 wherein said rakes each include a plurality of downwardly projecting fingers, each said finger projecting between a pair of adjacent said bars.

14. A method of dredging from a water based site comprising:

collecting a load of dredged material from a waterway;

depositing said load onto a stationary sieve;

straining a portion of said dredged material through said sieve;

determining whether said load contains waste or recoverable material;

if said determination indicates said load contains waste, then:

(a) sliding said waste in a first direction off of said sieve; and (b) disposing of said waste;

if said determination indicates said load contains recoverable material, then:

(a) sliding said recoverable material in a second direction opposite from said first direction off of said sieve;

(b) processing said recoverable material; and (c) transferring said processed recoverable material to a land based station.

15. The method of claim 14 wherein said sliding of said waste comprises pushing said waste with a rake.

16. The method of claim 14 wherein said sliding of said recoverable material comprises pushing said recoverable material with a rake.

17. The method of claim 14 wherein said processing comprises crushing said recoverable material.

18. The method of claim 14 further comprising:

collecting said portion of said load which was strained through said sieve;

processing said strained portion of said load; and mixing said strained portion with said recoverable material.

19. A method of dredging from a water based site comprising:

collecting a load of dredged material from a waterway;

depositing said load onto a grizzly having a stationary sieve;

straining said load through said sieve;

collecting a first portion of said load which was strained through said sieve;

processing said first portion of said load;

determining whether a second portion of said load on said sieve contains waste or recoverable material;

if said determination indicates said second portion contains waste, then:

(a ) sliding said waste in a first direction off of said sieve; and (b) disposing of said waste;

if said determination indicates said second portion contains recoverable material, then:

(a) sliding said recoverable material in a second direction opposite from said first direction off of said sieve and into a crusher; and (b) crushing said recoverable material;

mixing said recoverable material and said first portion; and transferring said recoverable material and said first portion to a land based station.

* * * * *